US005745589A

United States Patent [19]
Iwai et al.

[11] Patent Number: 5,745,589
[45] Date of Patent: Apr. 28, 1998

[54] RECORDING METHOD AND DECODING METHOD FOR DIGITAL INFORMATION USING MODULATION PATTERNS

[75] Inventors: Toshiyuki Iwai, Yamatokooriyama; Masahiro Esashi, Nara, both of Japan

[73] Assignee: Sharp Kabushiki Kaisha, Osaka, Japan

[21] Appl. No.: 612,303

[22] Filed: Mar. 7, 1996

[30] Foreign Application Priority Data

Mar. 10, 1995 [JP] Japan ................... 7-051445

[51] Int. Cl.⁶ ............................................ G06K 9/00
[52] U.S. Cl. ............................................ 382/100
[58] Field of Search ........................... 235/454, 456, 235/460–464, 466, 470, 487, 494; 209/583, 584; 382/100, 101, 103, 181, 183, 184, 193, 194, 199, 203, 204, 282, 291, 306, 317

[56] References Cited

U.S. PATENT DOCUMENTS

| | | | |
|---|---|---|---|
| 3,700,862 | 10/1972 | Snook et al. | 235/494 |
| 3,800,282 | 3/1974 | Acker | 235/494 |
| 3,806,706 | 4/1974 | Hasslinger et al. | 235/494 |
| 3,818,191 | 6/1974 | Fennema et al. | 235/494 |
| 3,914,578 | 10/1975 | Bigelow et al. | 235/494 |
| 4,095,096 | 6/1978 | Harada et al. | 235/494 |
| 4,874,936 | 10/1989 | Chandler et al. | 235/494 |
| 4,896,029 | 1/1990 | Chandler et al. | 235/494 |
| 4,924,078 | 5/1990 | Sant'Andselmo et al. | 235/494 |
| 4,998,010 | 3/1991 | Chandler et al. | 235/494 |
| 5,153,418 | 10/1992 | Batterman et al. | 235/494 |
| 5,324,923 | 6/1994 | Cymbalski et al. | 235/494 |
| 5,343,031 | 8/1994 | Yoshida | 235/494 |
| 5,357,094 | 10/1994 | Baldwin | 235/494 |
| 5,408,543 | 4/1995 | Yoshida | 382/317 |
| 5,515,447 | 5/1996 | Zheng et al. | 382/100 |
| 5,541,396 | 7/1996 | Rentsch | 235/454 |

Primary Examiner—Jose L. Couso
Attorney, Agent, or Firm—David G. Conlin; George W. Neuner

[57] ABSTRACT

A small block having a particular configuration that fills up an information recording area without clearances is set. The small block made up by giving marks of different values to cells arrayed in a direction of at least one row and column is selected as a modulation block. A primary pattern corresponding to recording-object information is extracted in the units of small blocks, the extracted patterns are associated with the modulation pattern in the units of cells in one-to-one correspondence, and their exclusive-ORs are calculated respectively. A secondary pattern is recorded by a process that small blocks composed of marks representing the values of the exclusive-ORs are arrayed in the units in order in the information recording area.

12 Claims, 18 Drawing Sheets

RECORDING METHOD AND DECODING METHOD FOR DIGITAL INFORMATION USING MODULATION PATTERNS

BACKGROUND OF THE INVENTION

1. Field of the Invention

The present invention relates to a digital information recording method for recording digital information onto a flat recording surface by printing or the like. The invention also relates to a digital information decoding method for decoding digital information recorded in such a way.

2. Description of the Prior Art

Recently, there has been widely used a technique that digital information is coded and recorded as two-dimensional patterns in an information recording area provided within a flat recording surface of paper or the like. A known method of this technique is, for example, that matrix-arrayed square cells corresponding to bits of digital information are defined, where white and black representing a "0" and a "1", respectively, is given to the individual cells and thus information is recorded.

When the values of the cells set on the recording surface are extremely one-sided, whichever to white or black, the contrast is automatically adjusted by a reading device (e.g., scanner) that optically reads the recording surface. As a result, such noise as would be normally ignored may be enhanced so as to cause a misrecognition. That is, black noise (spot) that has appeared in the region of a white cell may be decided as a black mesh, or white noise (void) that has appeared in the region of a black cell may be decided as a white cell. Further, when a white cell is surrounded by black cell, there is a possibility that the region of the white cell may be invaded or crushed by blurs of ink with which black cells are printed, such that the white cell may be mis-decided as a black cell in reading process.

Also, in a reading process of the so-called self-clocking method, in which the reading device scans the recording surface to read the values of cell one by one while any shifts between reading device and recording surface are corrected (compensated), if one of white cells and black cells, whichever it is, have appeared in a long string, reading errors of mis-counting the number of cells are likely to become a problem. That is, since the self-clocking method is generally implemented by referencing-the edges (boundaries) between white and black cells, a moderate dispersion of white and black cells causes the edges between them to appear at proper frequencies, allowing an easy correction. For example, when a string of three black cells are succeeded by a white cell, it is easy to correct any shift. In contrast to this, when either white cells or black cells appear in a long string, the compensation using edges (boundaries) would no longer be applicable. For example, when a string of twenty black cell are succeeded by a white cells, it is difficult to correct any shift, where the case may be mis-decided that twenty-one black cells have been placed in series.

In general digital information, it is likely to occur that value "1s" or value "1s" string. For example, in the case of image data or the like, if data is viewed in the units of bytes, such values as 00 (hexadecimal) or ff (hexadecimal) are more likely to be used than others. There is a possibility, in some extreme cases, that the values of the cells constituting the recording surface may be all blacks because the bits of recorded data are all "1s", or conversely, that the values of the cells constituting the recording surface may be all whites because the bits of recorded data are all "0s".

In the case of, for example, ASCII (American Standard Code for Information Interchange) data, since the most significant bit is necessarily a "0", the iteration pattern of data matters. FIG. 22 shows an example in which ASCII numerical data is recorded on the basis of cells arrayed into a transverse 24×longitudinal 16 matrix in an information recording area 23 within the recording surface 20. In this example, each row is divided into three longitudinally (in the direction of column), every eight meshes, where information in the units of bytes is stored in the eight cells. Bytes are stored sequentially, first from left to right in the top row, then from left to right in the second top row, and so forth in the following rows. The bits in each byte are arrayed so that the most significant bit comes to the leftmost place, and the least significant bit comes to the rightmost place. Since forty-eight bytes of data can be stored in this information recording area 23, forty-eight numerals of 0 to 9 (30 (hexadecimal) to 39 (hexadecimal)) are recorded in ASCII data. Then, as seen from the figure, white cells form a longitudinal string on two cells corresponding to the most significant digit and its succeeding second digit of each byte, i.e., on the 1st, 2nd, 9th, 10th, 17th, and 18th columns, counting from the left. Also, black cells form a longitudinal string on the 3rd, 4th, 11th, 12th, 19th, and 20th columns, counting from the left. Thus, also then iterated patterns of data are involved, white cells or black cells are likely to string as another problem.

Under this background, the present inventor has previously proposed a technique that small blocks each composed of three or more adjoining cells and having such a specific configuration that the small blocks, when adjoiningly arrayed in a plurality, can fill up the recording surface without clearances are set on the recording surface, where specified patterns of which the number of strung cells having the same value is not greater than a specified number in at least one direction of the row and column directions are associated with the small blocks, respectively (JP Patent Laid-open Publication No. HEI 7-282169 (not prior art)). According to this technique, the maximum number of cells having the same value that can be strung in the recording surface can be restricted in each of the row and, column directions. Therefore, white meshes and black cells can be dispersed moderately, so that reading errors can be prevented.

However, in this technique, since the values of data to be recorded are associated with the specified patterns, there is a need of preparing a look-up table beforehand. This requires memory areas for the look-up table to be provided in the recording apparatus and decoding apparatus, involving a complexity to a problem. Further, since the patterns to be associated with the small blocks are restricted to specified patterns, the number of specified patterns that can be actually used is small for the amount (number of bits) of information that can originally be recorded to one small block. This poses a problem that the amount of information that is actually recorded within the recording surface is smaller than should be.

SUMMARY OF THE INVENTION

An object of the present invention is therefore to provide a digital information recording method including steps of defining matrix meshes corresponding to bits of digital information in an information recording area provided within a flat recording surface, providing the cells with optically recognizable marks each corresponding to a value of "0" or "1", and recording recording-object digital information as two-dimensional patterns composed of the marks, wherein marks having the same value can be distributed so as not to string with respect to either the row or column direction, and wherein the digital information can be recorded conveniently without reducing the amount of information. A further object of the present invention is to provide a digital information decoding method suited for decoding digital information recorded in such a way.

In order to achieve the aforementioned object, a method for recording digital information according to the first embodiment of the present invention, comprises steps of virtually setting matrix cells corresponding to bits in an information recording area provided within a flat recording surface, providing the cells with optically recognizable marks each corresponding to a value of "0" or "1" to thereby record recording-object digital information as a two-dimensional pattern composed of the marks, the method being characterized by further comprising steps of:

setting a small block composed of three or more adjoining cells to each of which the mark corresponding to a value of "0" or the mark corresponding to a value of "1" is to be given such that the small block has a pattern of the marks, said small block being configured such that when the small block is arrayed in a plurality, the plurality of small blocks fill the information recording area without clearances;

selecting (i.e. adopting) as a modulation pattern, from among a plurality of the patterns assumed by the small block, a pattern in which the marks in at least one column include one or more marks corresponding to a value of "0" and one or more marks corresponding to a value of "1", and in which the marks in at least one row include one or more marks corresponding to a value of "0" and one or more marks corresponding to a value of "1";

extracting the marks given to the cells of the information recording area as a primary pattern;

calculating exclusive-ORs of values of the extracted marks, in units of the small blocks, of the primary pattern and values of the marks of the modulation pattern, respectively; and arraying the calculated exclusive-ORs in the information recording area as a secondary pattern.

For example, the configuration of the small block may be a rectangle having a size of "p" cells in any one direction of the row and column directions (where p denotes an integer not smaller than 2 but not greater than a specified number), and "q" cells in the other direction of the row and column directions (where q denotes an integer not smaller than 2 but not greater than p), wherein the modulation pattern is a pattern in which the number of stringing marks representing the same value is smaller than "p" in the one direction and smaller than "q" in the other direction.

In the digital information recording method according to the first embodiment of the present invention, the primary pattern is a pattern to be originally expressed in the information recording area, where it can be presumed that marks corresponding to 0 or 1 string in many cases. Meanwhile, the modulation pattern is selected from among a plurality of the patterns assumed by the small block, the marks in at least one column include one or more marks corresponding to a value of "0" and one or more marks corresponding to a value of "1", and in which the marks in at least one row include one or more marks corresponding to a value of "0" and one or more marks corresponding to a value of "1". Therefore, an array of this modulation pattern is iterations of a mark corresponding to a "0" and another mark corresponding to a "1", along both row and column directions. In this connection, the secondary pattern is created by extracting the marks given to the cells of the information recording area as a primary pattern; calculating exclusive-ORs of values of the extracted marks, in units of the small blocks, of the primary pattern and values of the marks of the modulation pattern, respectively; and arraying the calculated exclusive-ORs in the information recording area. Therefore, as a whole, the secondary pattern is equivalent to the result of exclusive-ORing the primary pattern and the array of modulation patterns in the units of cells. As a result, the secondary pattern is a pattern in which marks each corresponding to a "0" and marks each corresponding to a "1" are dispersed in both row and column directions. That is, the secondary pattern is a pattern in which marks representing the same value will not string to a large number along the row or column direction.

As a consequence of this, the contrast is not one-sided to white or black in a reading process by the reading device (scanner or the like), so that noise will not be enhanced. Also, when a sequential reading operation is done by the so-called self-clocking method, edges (boundaries) between white and black cells appear at a moderate frequency, so that the correction is easy to accomplish. Accordingly, reading errors are unlikely to occur.

Further, in a process of calculating exclusive-ORs between primary pattern and modulation patterns, that is, in obtaining secondary patterns by modulating the primary pattern, it is sufficient to perform simple bit operations (exclusive-OR), and there is no need of preparing look-up tables beforehand. Accordingly, the recording apparatus for carrying out this digital information recording method does not need to be provided with memory areas for look-up tables, so that information can be recorded conveniently. Also, since the secondary pattern obtained by the modulation has the same information density as the primary pattern, the amount of information that is actually recorded in the information recording area will never be less than that of the primary pattern that should originally be recorded.

Further, also in decoding information recorded in this way, the primary pattern can be obtained by demodulating the secondary pattern only with simple bit operations (exclusive-OR), where it is unnecessary to prepare look-up tables beforehand. Accordingly, the decoding apparatus for decoding the recorded information is not required to have memory areas for look-up tables. Still, the same algorithm may be used for both modulation and demodulation. As a result, the information recorded in the information recording area can be decoded with convenience.

A method for recording digital information according to the second embodiment of the present invention, comprises steps of virtually setting matrix cells corresponding to bits in an information recording area provided within a flat recording surface, providing the cells with optically recognizable marks each corresponding to a value of "0" or "1", and recording recording-object digital information as a two-dimensional pattern composed of the marks, the method being characterized by further comprising steps of:

setting a small block composed of two or more cells adjoining one another within one row or one column;

selecting, as a first modulation pattern, a pattern made up by giving marks of different values to cells adjoining one another in a direction in which the small block extends among a group of patterns that the small block can assume, and selecting a second modulation pattern obtained by inverting the marks of the first modulation pattern;

extracting, in units of small blocks, a primary pattern made up by giving marks to the cells of the information recording area in correspondence to the recording-object information; and expressing a secondary pattern which is formed through steps of associating the extracted patterns with the first modulation pattern in one-to-one correspondence for odd rows or columns while associating the extracted patterns with the second modulation pattern in one-to-one correspondence for even rows or columns, calculating exclusive-ORs of values represented by corresponding cells, respectively, and arraying patterns in the units of small blocks composed of marks representing the values of the exclusive-ORs in order.

In the digital information recording method according to the second embodiment of the present invention, as in the first embodiment, the primary pattern is a pattern originally intended to be expressed in the information recording area, where it can be presumed that marks each corresponding to a "0" or a "1" string in many cases. Meanwhile, the first modulation pattern is a pattern in which marks of different values are given to the cells arrayed in the a direction in which the small block extends among the group of patterns that the small block having cells adjoining one another within one row or one column can assume, and the second modulation pattern is a pattern obtained by inverting the first modulation pattern. Therefore, an array of these first and second modulation patterns in a direction vertical to the direction in which the small block extends is iterations of a mark corresponding to a "0" and another mark corresponding to a "1" along both row and column directions. In this connection, the secondary pattern is created by extracting in the units of small blocks the primary pattern made up by giving marks to the cells of the information recording area in correspondence to the recording-object digital information, associating the extracted patterns with the first modulation patterns in one-to-one correspondence for odd rows or columns while associating the extracted patterns with the second modulation patterns in one-to-one correspondence for even rows or columns, calculating exclusive-ORs of values represented by corresponding cells, respectively, and arraying the patterns in the units of small blocks composed of marks representing the resulting values of exclusive-ORs, one by one. Therefore, as a whole, the secondary pattern is equivalent to the result of exclusive-ORing the primary pattern with the array of the first and second modulation patterns in the units of cells. As a result, the secondary pattern is a pattern in which marks each corresponding to a "0" and marks each corresponding to a "1" are dispersed in both row and column directions. That is, the secondary pattern is a pattern in which no large number of marks representing the same value will string along the row or column direction.

As a consequence of this, as in the first embodiment, noise will not be enhanced and correction is easy to accomplish, so that reading errors are unlikely to occur. Further, information can be recorded conveniently without reducing the amount of information. Besides, the recorded information can be decoded conveniently.

Further, by setting the constants representing the first modulation pattern and the second modulation pattern, to a unit that is easy to process for 8-bit, 16-bit, or other computers, calculations for modulation or demodulation can be processed with high efficiency.

Also, by keeping it in secret against the third party, which modulation pattern has been used to carry out the modulation, it becomes difficult for the third party to decode the secondary pattern. Thus, an effect of a kind of cryptography is produced so that the secrecy of information can be enhanced.

The method for recording digital information according to the third embodiment of the present invention, further comprises steps of:

selecting a plurality of types of modulation patterns or first and second modulation patterns; and using the plurality of types of modulation patterns or first and second modulation patterns depending on pattern configuration of the primary pattern.

In the digital information recording method according to the third embodiment of the present invention, the modulation pattern or the first and second modulation patterns are selected in a plurality of types, and the plurality of types of modulation patterns or first and second modulation patterns are used selectively depending on the pattern configuration of the primary pattern. Therefore, it becomes possible to select an optimum modulation pattern or optimum first and second modulation patterns to create the secondary pattern. It becomes also possible to use an optimum modulation pattern or optimum first and second modulation patterns for the individual components of the primary pattern, depending on the pattern configuration of the individual components of the primary pattern, by determining which modulation pattern produces the secondary pattern having smaller numbers of stringing cells of the same value.

The method for recording information according to the fourth embodiment of the present invention, further comprises a step of:

using a pattern of a portion of the primary pattern corresponding to a particular region of the information recording area, as it is, as a pattern for a portion of the secondary pattern corresponding to the particular region.

In the digital information recording method according to the fourth embodiment of the present invention, a portional pattern in the primary pattern, corresponding to a particular region of the information recording area is used, as it is, or without modulation, as the portional pattern for the particular region in the secondary pattern to be obtained. Therefore, optical characteristics of the primary pattern corresponding to the particular region are preserved as they are. For example, when control information such as clocks are arranged within the primary pattern, the optical characteristics of this control information are preserved as they are. Accordingly, even in the secondary pattern, edges and positions of the cells can be shown by the control information.

A digital information decoding method for decoding recorded information recorded by the digital information recording method according to the fifth embodiment of the present invention, comprises steps of:

adopting, as a demodulation pattern, a pattern identical to the modulation pattern;

obtaining the original primary pattern through steps of extracting, in the units of small blocks, the secondary pattern expressed in the information recording area, associating the extracted patterns with the demodulation pattern in units of cells in one-to-one correspondence, calculating exclusive-ORs of values represented by corresponding cells, and arraying patterns in the units-of small blocks composed of marks representing values of the exclusive-ORs in order.

In the digital information decoding method according to the fifth embodiment of the present invention, the original primary pattern can be obtained with the same algorithm as in the method of recording the secondary pattern in the information recording area. Accordingly, recorded information can be decoded easily.

The digital information decoding method according to the sixth embodiment of the present invention, further comprises steps of:

preparing demodulation patterns corresponding to all possible types of modulation patterns that might have been selected in a stage at which the secondary pattern is recorded in the information recording area; and calculating the exclusive-ORs by using the demodulation patterns, for the patterns extracted in the units of small blocks, deciding whether or not values of the exclusive-ORs are information having a predetermined form, and, if the values of the exclusive-ORs are information having a predetermined form, then adopting the information as information corresponding to the small blocks of the information recording area.

In the digital information decoding method according to the sixth embodiment of the present invention, demodulation patterns corresponding to all the types of possible modulation patterns that might have been selected in the stage of recording the secondary pattern in the information recording area are prepared, exclusive-ORs are calculated by using the demodulation patterns with respect to patterns extracted in the units of small blocks, and it is decided whether or not the resulting values of exclusive-ORs are information having a predetermined form, where if the values of the exclusive-ORs are information having the predetermined form, then the information is adopted as information corresponding to the small blocks of the information recording area. Therefore, information recorded in the information recording area can be decoded while the types of modulation are distinguished. In addition, when the secondary pattern recorded in the information recording area is a pattern recorded by modulation with one type of modulation pattern, it is sufficient to decide whether or not the values of exclusive-ORs are information having a predetermined form with respect to one small block or several small blocks, where this decision does not need to be carried out for the entire information recording area.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The digital information recording method and decoding method of the present invention are now described in more detail by embodiments thereof.

(First Embodiment)

First, an example of the digital information recording method is explained.

Figure 1:
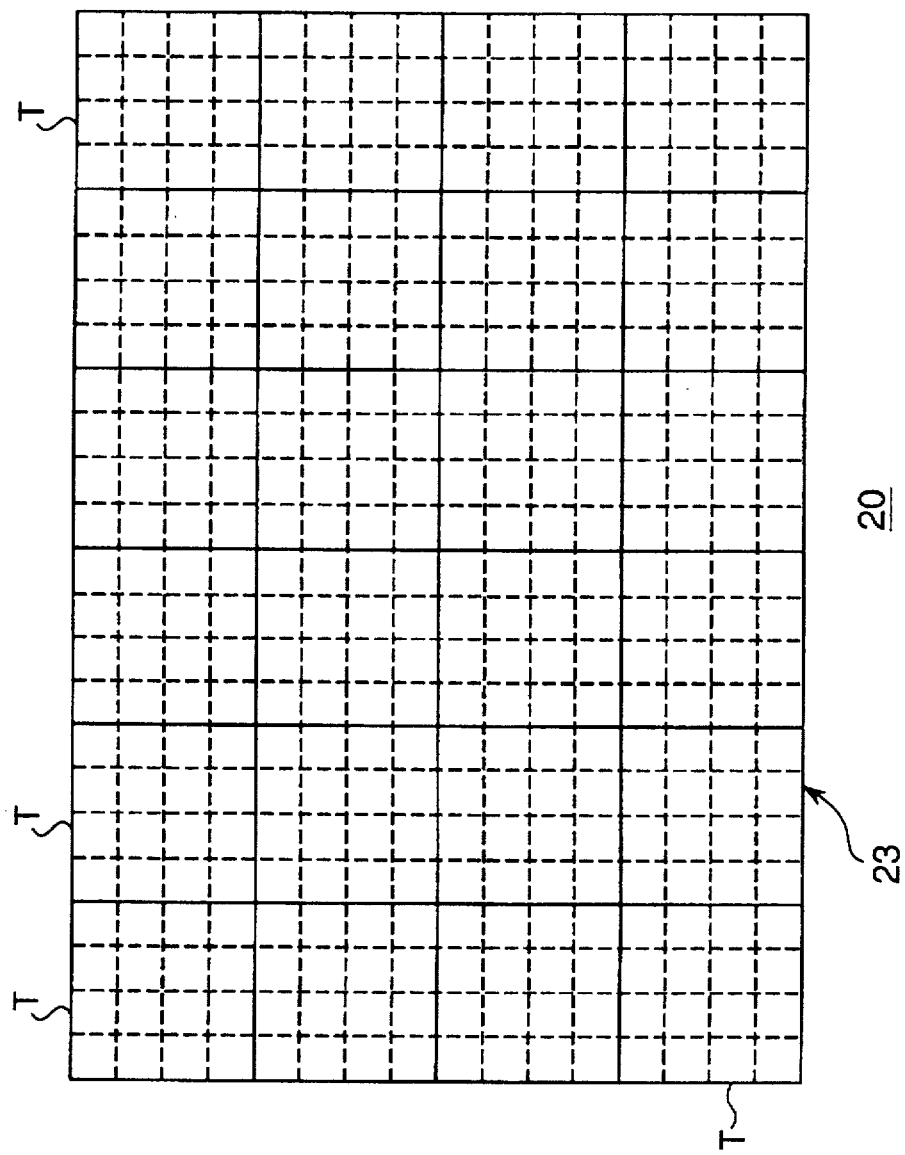
FIG. 1 is a view showing an example in which small blocks adjoining in the units of transverse 4×longitudinal 4 cells are set in an information recording area provided within a recording surface.

FIG. 1 shows an information recording area 23 provided in, a flat recording surface 20, onto which information is to be recorded by the recording method. In this information recording area 23, matrix cells (expressed by broken lines) corresponding to bits are virtually set. In this example, transverse 24×longitudinal 16 square cells are set.

Figure 22:
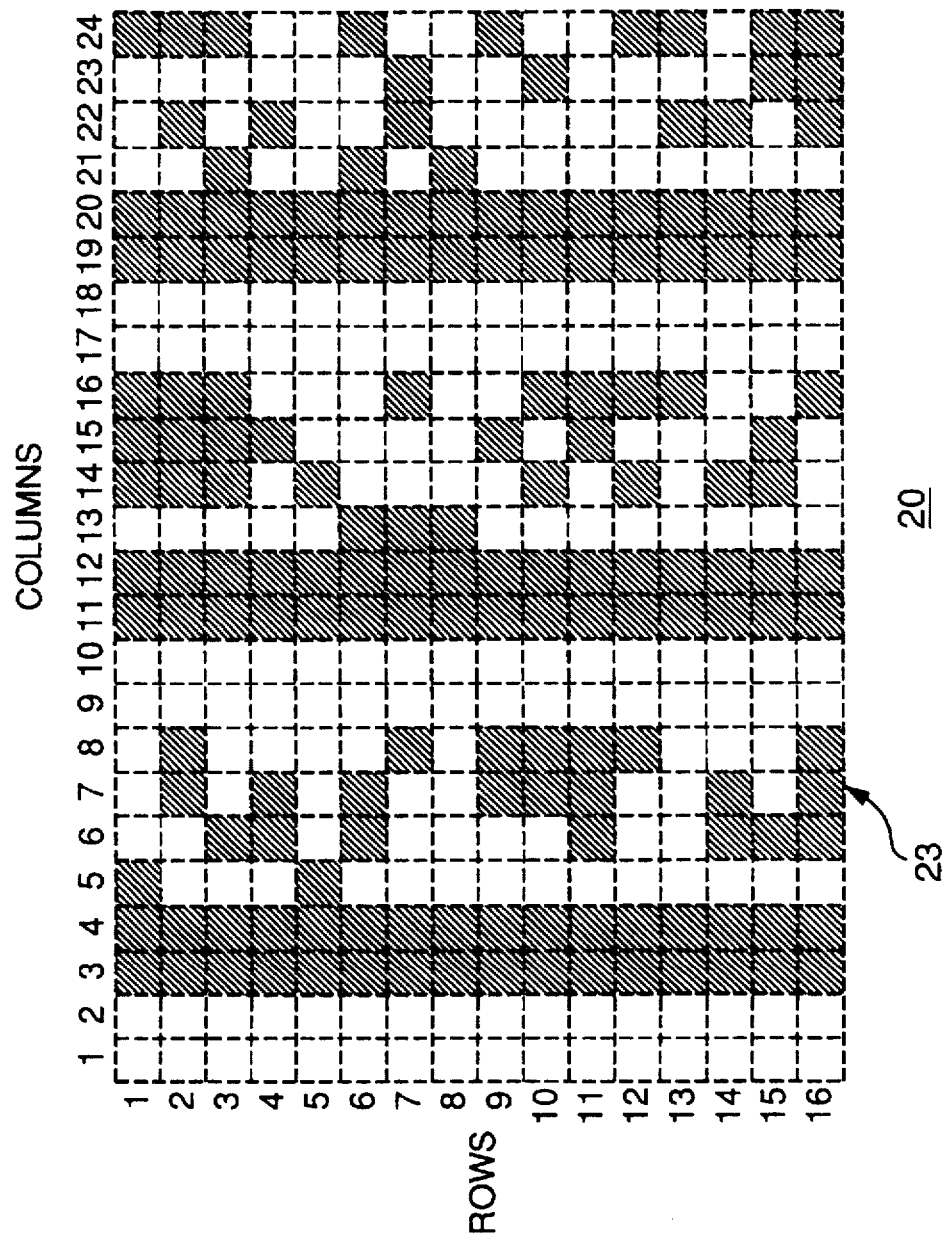
FIG. 22 is a view showing an example in which ASCII numerical data is recorded in an information recording area provided within a recording surface by a conventional recording method.

As an optically recognizable mark corresponding to a "0" or a "1", a white (light) representing a value "0" or a black (dark) representing a value "1" is given to each cell (the black is expressed by hatching for convenience), as in the case of FIG. 22.

Also, a small block T (expressed by solid lines) composed of 16 cells, which are adjoining into a square of transverse 4×longitudinal 4 meshes, is set. Transverse 6×longitudinal 4 small blocks T fill up the information recording area 23 without clearances.

Figure 2:
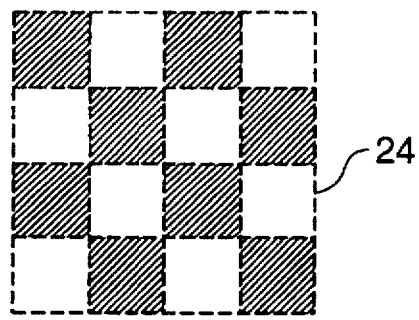
FIG. 2 is a view showing an example of the unitary pattern.

Among the group of patterns that the small block T can assume by white or black being given to each of the cells, a checkered pattern 24 as shown in FIG. 2 is selected (i.e. adopted) as a modulation pattern. In more detail, the values of the first row of this modulation pattern 24 are is "1010", those of the second to fourth rows are "0101", "1010", and "0101", respectively, where whites and blacks are alternately arrayed in both row and column directions.

Meanwhile, a primary pattern is created by giving a white or a black to each of the cells in the information recording area 23 in correspondence to the digital information to be recorded. This primary pattern is a pattern that is originally intended to be expressed in the information recording area 23. In this example, the pattern as shown in FIG. 22, in which large numbers of whites or blacks string, is taken as the primary pattern.

Then, portions of the primary pattern of FIG. 22 corresponding to the individual small blocks T are extracted sequentially from left top corner to right top corner, from left to right of the succeeding step, and so forth. By associating the extracted patterns with the modulation pattern 24 in the units of cells in one-to-one correspondence, exclusive-ORs of the values represented by corresponding meshes are calculated, respectively. The patterns in the units of small blocks T composed of the marks representing the resulting values of exclusive-ORs are arrayed sequentially from left top corner to right top corner, and then from left to right of the succeeding step, and so forth, whereby a secondary pattern is created. The resulting secondary pattern is expressed in the information recording area 23.

Figure 5:
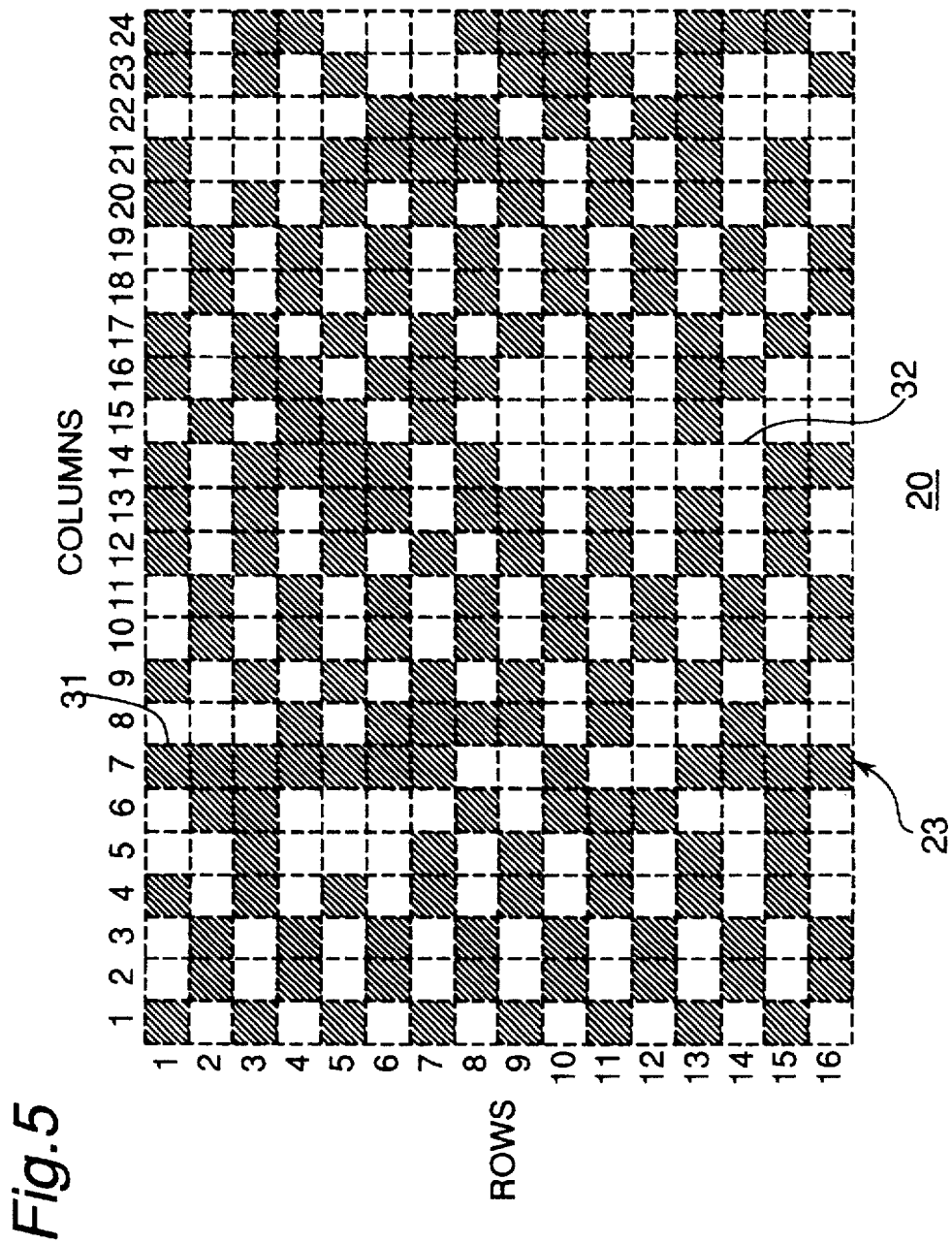
FIG. 5 is a view showing an example in which information is recorded by a digital information recording method which is an embodiment of the present invention.

In this example, a pattern as shown in FIG. 5 is obtained as the secondary pattern. The secondary pattern of FIG. 5 will never have one row or one column all filled with white cells or black cells, but is a pattern in which whites and blacks are moderately dispersed so that whites or blacks will not string to a large number with respect to either the row or column direction, as compared with the primary pattern shown in FIG. 22. The reason is that, since the primary pattern of FIG. 22 has whites or blacks stringing to a large number and since an array of the modulation patterns 24 of FIG. 3 has whites and blacks alternately iterated in both row and column directions, the secondary pattern equivalent, as a whole, to a result of exclusive-ORing the two patterns in the units of cells has whites and blacks dispersed with respect to both row and column directions.

As a result, the contrast will never be one-sided to white or black in reading operation with a reading device (scanner or the like), so that noise will never be enhanced. Also, when the cells are read sequentially by the so-called self-clocking method, there will appear edges (boundaries) between white and black cells at moderate frequencies, allowing an easy correction. Therefore, any reading errors can be prevented from occurring.

Further, according to this recording method, in calculating the exclusive-ORs between primary pattern and modulation pattern, that is, in obtaining the secondary pattern by modulating the primary pattern, it is sufficient to perform simple bit calculations (exclusive-OR), eliminating the need of preparing look-up tables beforehand. Accordingly, there is no need of providing memory areas for look-up tables in the recording apparatus that carries out this recording method, so that information can be recorded conveniently. Also, since the secondary pattern obtained by the modulation has the same information density as the primary pattern, the amount of information that is actually recorded in the information recording area 23 will never be less than that of the primary pattern that should originally be recorded.

Further, even in the process of decoding the information recorded in such a way, it is sufficient to perform simple bit calculations (exclusive-OR) for obtaining the primary pattern by demodulating the secondary pattern, where it is unnecessary to prepare look-up tables or the like beforehand. Accordingly, there is no need of providing memory areas for look-up tables in the decoding apparatus. Still, the same algorithm may be used for both modulation and demodulation. Consequently, information recorded in the information recording area 23 can be decoded conveniently.

Also, by keeping it in secret against the third person which modulation pattern has been used to perform the modulation, it becomes difficult for the third person to decode the secondary pattern. Thus, an effect of a kind of cryptography is produced so that the secrecy of information can be enhanced.

In addition, as a result of the arrangement that white cells and black cells are alternately arrayed partly (for example, on the 7th and 14th columns) within the primary pattern of FIG. 22, there occur portions 31, 32 where white cells or black cells form a more or less long string within the secondary pattern of FIG. 5. However, such a partial array of alternated white and black cells is only a trivial matter, whereas in the primary pattern of FIG. 22, the fact that white cells and black cells form a longitudinal string on the 1st to 4th columns, the 9th to 12th columns, and the 17th to 20th columns is an essential matter that inevitably occurs in coding only numerals of ASCII data. Generally speaking, in such a case as coding numerals of ASCII data, this recording method allows an effective white-and-black dispersion to be achieved.

Figure 19:
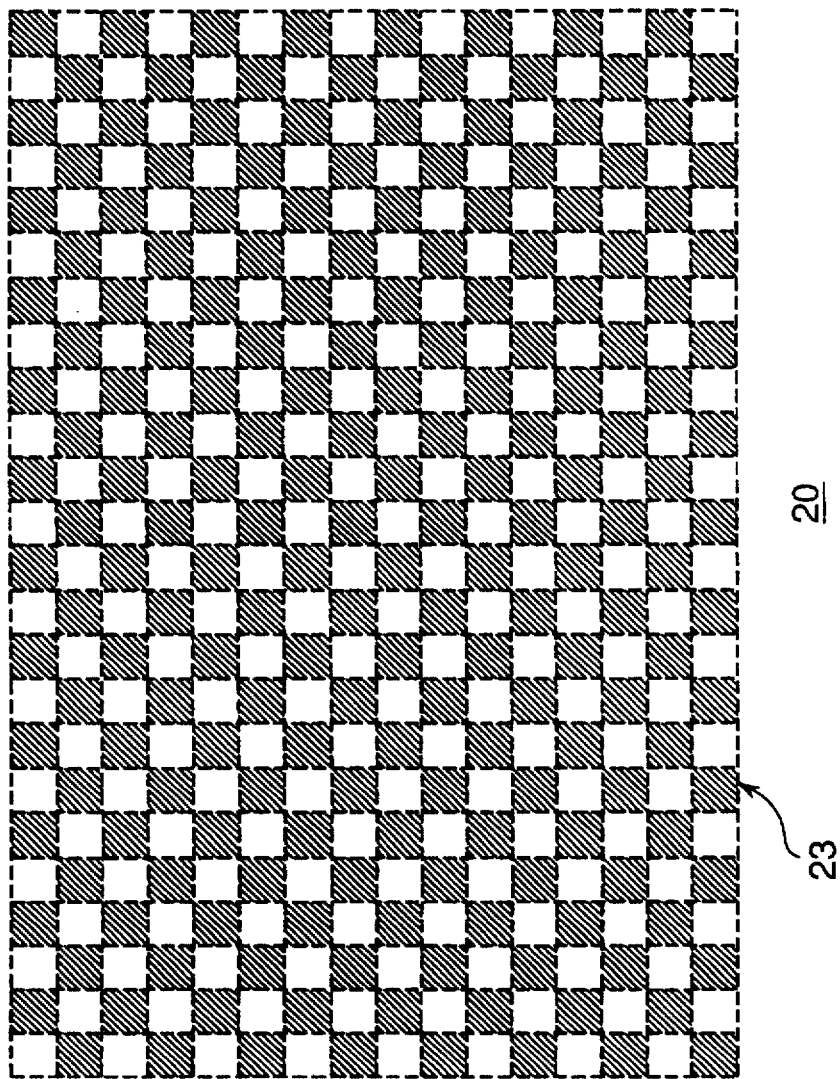
FIG. 19 is a view showing a primary pattern in which the entire region within the information recording area is formed into a checkered pattern.

However, when white and black cells are alternately arrayed to a wide range in the primary pattern, it is presumed that calculating exclusive-ORs with the modulation pattern 24 of FIG. 2 would result in an occurrence of portions where white or black cells form a long string in the secondary pattern. In particular, when the entire primary pattern is checkered as shown in FIG. 19, the secondary pattern becomes all white or black (black in this example). If such a thing is previously known, another preferable modulation pattern should be selected from among the group of patterns that the small blocks T can assume. As the modulation pattern, it is possible to prepare a plurality of types of patterns in which at least one row has white cells and block cells arrayed in the row direction and at least one column has white cells and black cells arrayed in the column direction so that a preferable one may be selected and used, from among the group of patterns that the small block can assume. Also, when white or black cells form a long string unfavorably as a result of performing the modulation, it is also possible to selectively suppress the modulation depending on the pattern.

Figure 3:
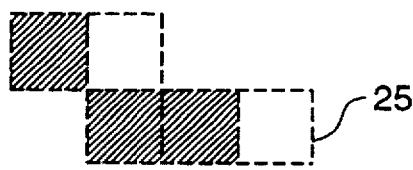
FIG. 3 is a view showing another example of the unitary pattern.
Figure 6:
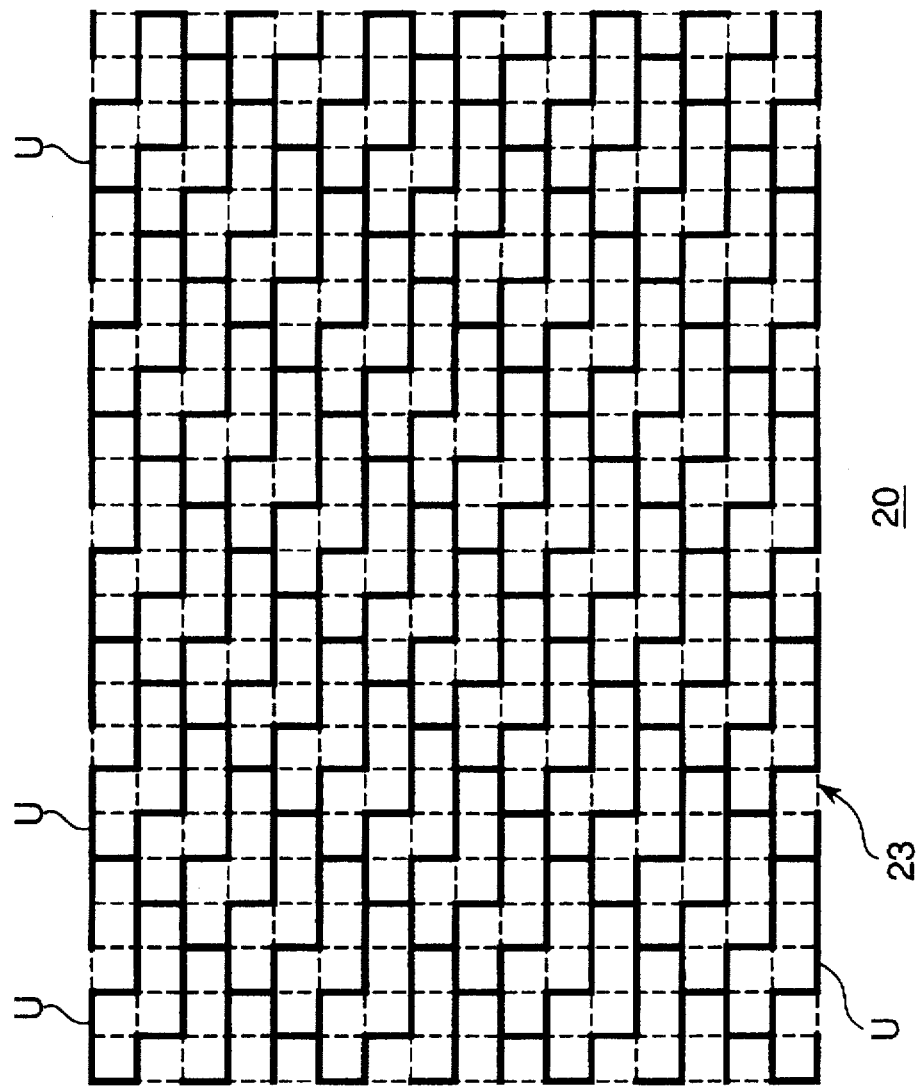
FIG. 6 is a view showing an example in which another small block is set in the information recording area provided within the recording surface.

Further, the small block is not limited to square or rectangular shapes, but is required only to be composed of three or more adjoining cells and, when adjoiningly arrayed in a plurality, able to fill the information recording area 23 without clearances. For example, a small block U may be set, as shown in FIG. 6, where the small block U has a configuration that two cells arrayed in one row and three cells arrayed in the next row adjoin each other at one side of the cells with a shift in the row direction. In this case, a modulation pattern 25 as shown in FIG. 3 may be selected. In addition, in FIG. 6, the small block U is incomplete at the end of the information recording area 23, but this is no problem. Because it is sufficient if the primary pattern and the modulation pattern can be associated with each other in the units of cells in one-to-one correspondence and exclusive-ORs of values represented by corresponding meshes can be calculated.

Figure 7:
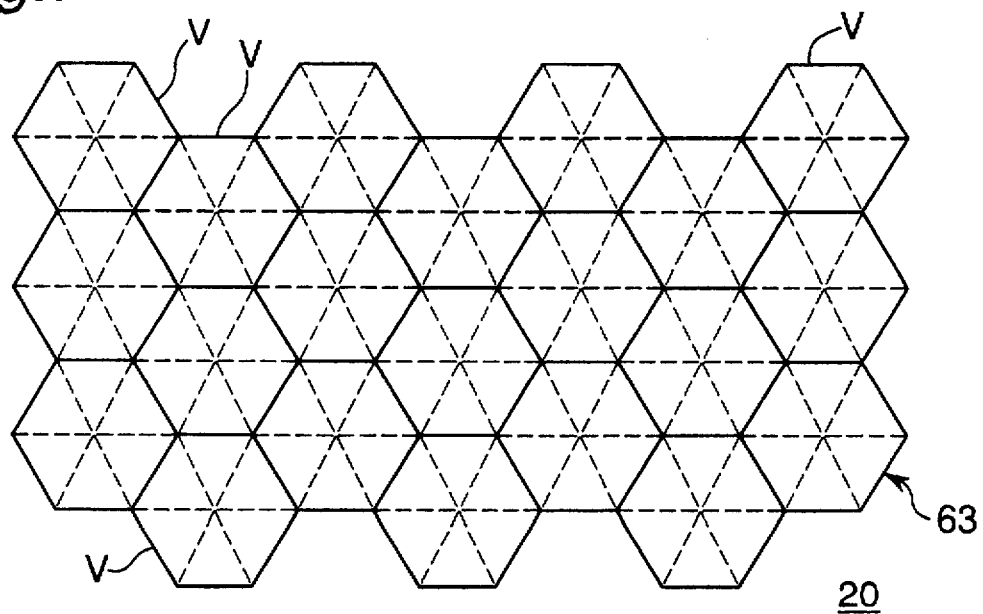
FIG. 7 is a view showing an example, in which small blocks adjoining in the units of six cells are set in an information recording area made up from triangular cells and provided in the recording surface.
Figure 8:
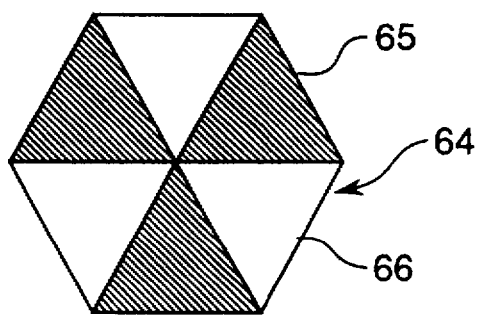
FIG. 8 is a view showing an example of the unitary pattern suited to the small block of FIG. 7.

Further, the mesh is not limited to square or rectangular shapes, either. As shown in FIG. 7, an information recording area 63 may be made up from triangular cells (expressed by broken lines). In this case, a small block V composed of six triangular cells the vertex may be set. Also, as shown in FIG. 8, a modulation pattern 64 having whites and blacks alternately given to adjoining triangular cells may be adopted.

(Second Embodiment)

Next, another example of the digital information recording method is explained.

It is assumed that information is recorded in an information recording area 23 composed of transverse 24×longitudinal 16 square cells as shown in FIG. 1, where the pattern shown in FIG. 22 is taken as the primary pattern.

In this example, a small block (not shown) composed of eight cells linearly adjoining one another in one row is set. Also, among the group of patterns that the small block can assume, a pattern "black/white/black/white/white/black/white/black" representing "10100101" is selected as a first modulation pattern. Together with this, a pattern "white/black/white/black/black/white/black/white" representing "01011010", which is the inversion of the first modulation pattern, is selected as a second modulation pattern. It is noted that these first and second modulation patterns correspond to 8-bit constants, respectively.

Then, the primary pattern of FIG. 22 is extracted in the units of small blocks sequentially from left top corner to right top corner, then from left to right of the succeeding step, and so on. For odd rows, the extracted patterns are associated with the first modulation pattern in one-to-one correspondence. For even rows, on the other hand, the extracted patterns are associated with the second modulation pattern in one-to-one correspondence. Subsequently, exclusive-ORs of values represented by corresponding cells are calculated, respectively. Then, patterns in the units of small blocks composed of marks representing the resulting values of exclusive-ORs are arrayed sequentially from left top corner to right top corner, from left to right of the succeeding step, and so on, whereby a secondary pattern is created. This second pattern is expressed in the information recording area 23.

Figure 9:
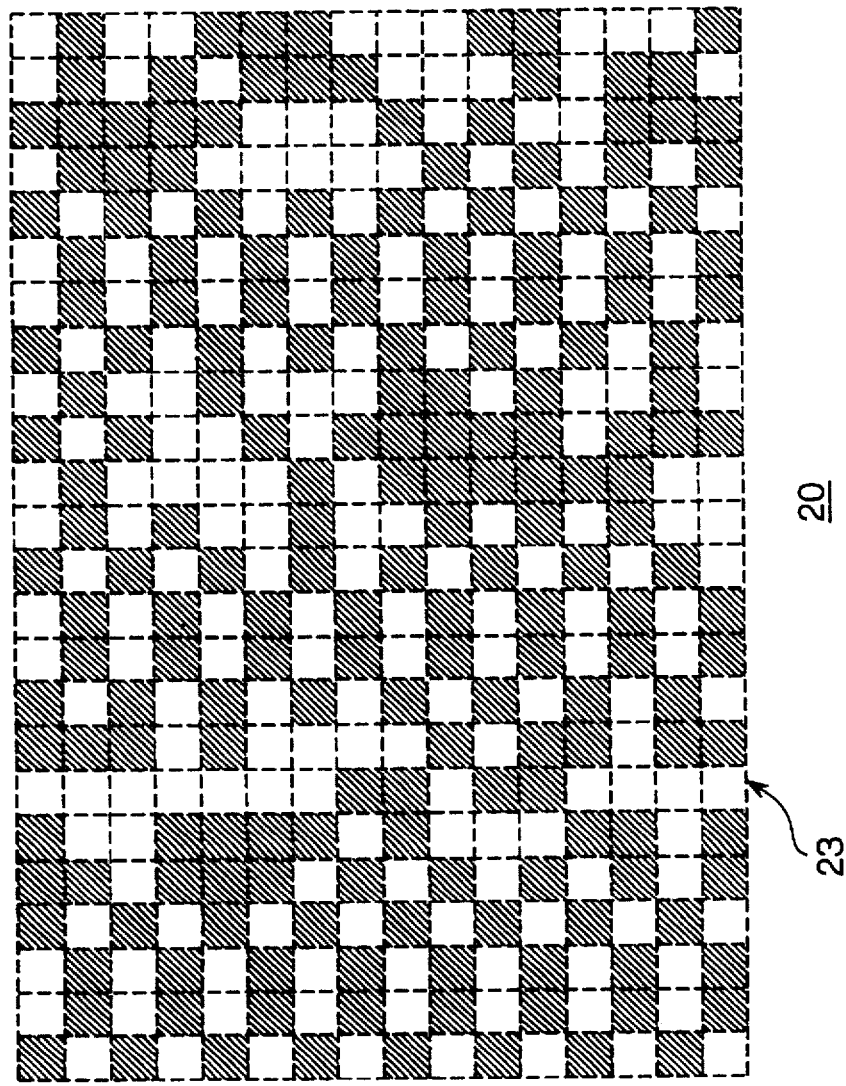
FIG. 9 is a view showing an example in which information is recorded by a digital information recording method which is an embodiment of the present invention.

In this example, as the secondary pattern, a pattern in which whites or blacks do not string to so large a number in the row or column direction can be obtained, as shown in FIG. 9. The reason of this is that since the primary pattern of FIG. 22 is a pattern in which rather long strings of whites or blacks are formed, and since an array of the first and second modulation patterns is a pattern in which whites and blacks are alternately iterated in both row and column directions, the secondary pattern equivalent, as a whole, to the result of exclusive-ORing the two patterns in the units of cells has whites and blacks dispersed with respect to both row and column directions.

As a consequence of this, like the first embodiment, noise will not be enhanced and compensation is easy to accomplish, so that any reading errors can be prevented from occurring. Also, information can be recorded conveniently without reducing the amount of information. Further, recorded information can be decoded conveniently.

Besides, the calculation for modulation or demodulation can be carried out efficiently by setting the constants representing the first modulation pattern and the second modulation pattern, to a unit of i.g. 8-bit or 16-bit that is easy for processors to process.

Further, by keeping it in secret against the third person which modulation pattern has been used to perform the modulation, it becomes difficult for the third person to decode the secondary pattern. Thus, an effect of a kind of cryptography is produced, so that the secrecy of information can be enhanced.

In addition, for setting the small block, a small block in which rows and columns are replaced with each other and which is composed of meshes linearly adjoining in the column direction may also be set. In this case, the first modulation pattern is formed into a pattern in which marks of different values are given to the meshes arrayed in the column direction. The second modulation pattern is formed into a pattern in which the marks of the first modulation pattern are inverted.

(Third Embodiment)

Next explained is an example in which a pattern of a portion of the primary pattern corresponding to a particular region of the information recording area 23 is used, as it is, as the pattern for the portion out of the secondary pattern corresponding to the particular region.

Figure 10:
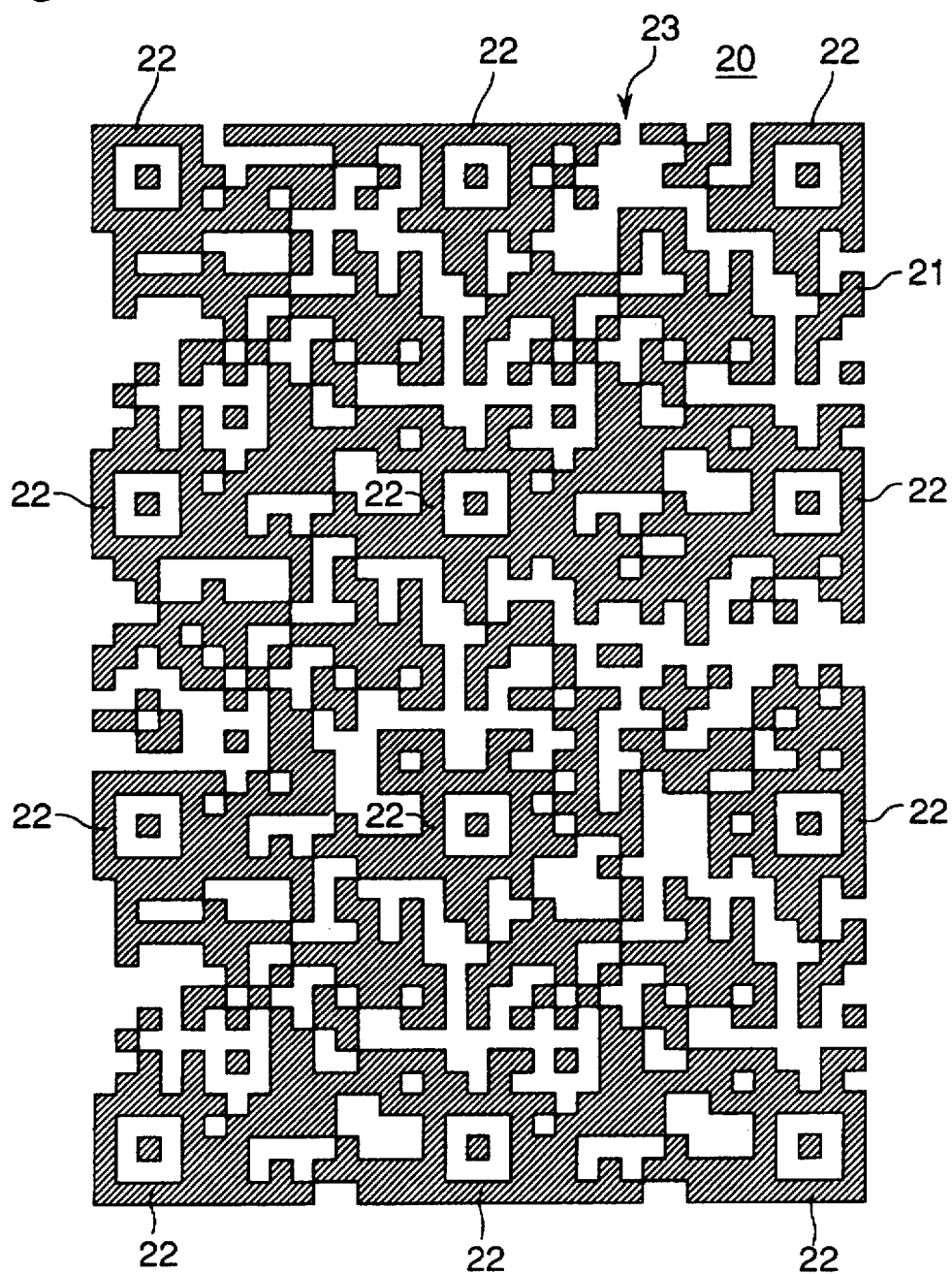
FIG. 10 is a view showing an example of the secondary pattern in which specific patterns indicating positions of cells in the primary pattern, are left, as they are.

FIG. 10 shows an example in which a portion 22 corresponding to control information for indicating positions of cells, out of the primary pattern, is left, as it is, within the secondary pattern.

Figure 11:
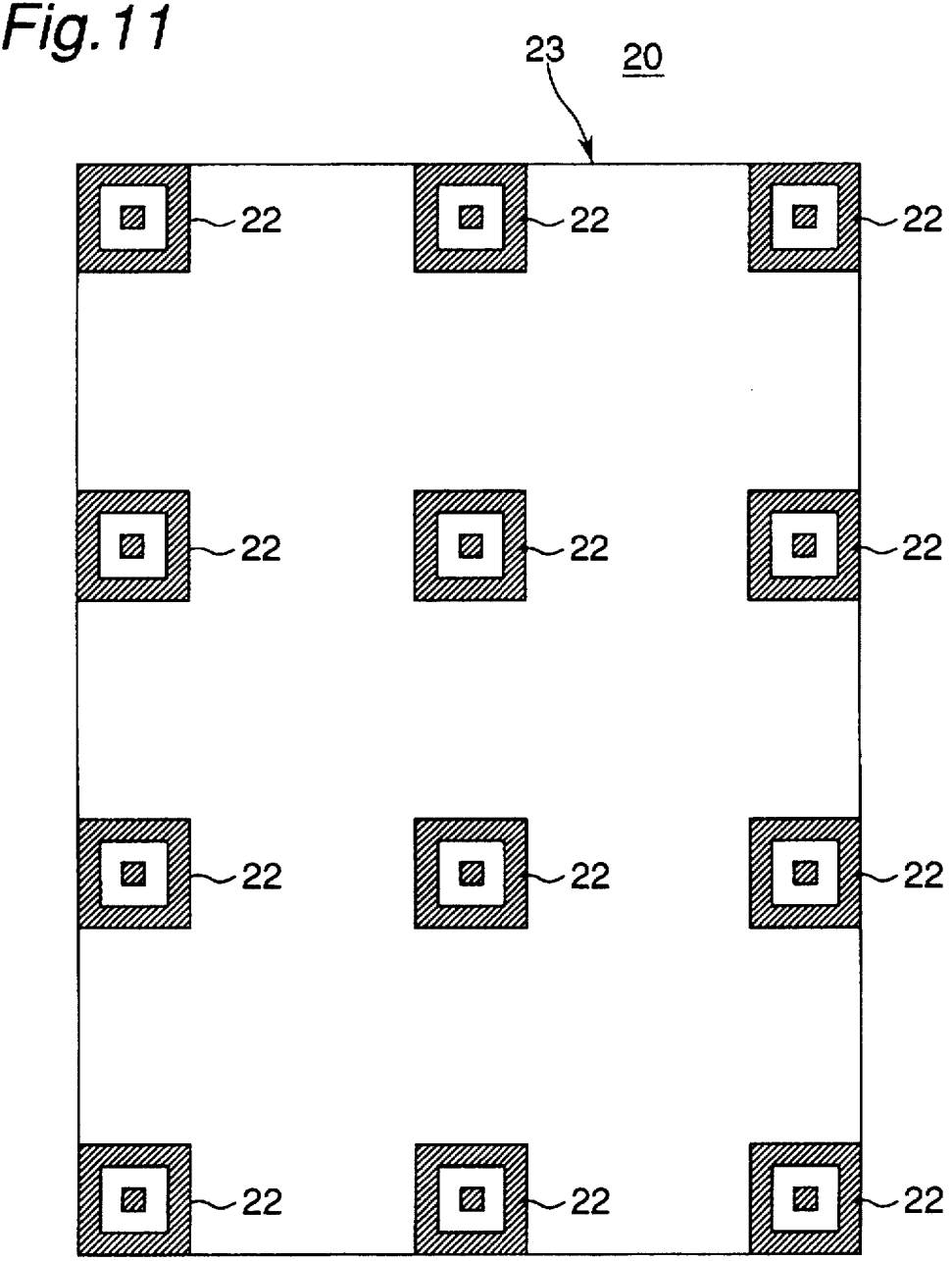
FIG. 11 is a view showing the arrangement of specific patterns in the information recording area of FIG. 10.

More specifically, in the information recording area 23 within the recording surface 20, a plurality of specific patterns 22 in which whites and blacks are given in a specific pattern to a plurality of cells adjoining into a particular configuration are arranged between the areas 23 in which information is recorded actually. In this example, totally twelve specific patterns 22 of longitudinal 4×transverse 3 are arranged in a matrix within a rectangular information recording area 23 with longitudinal and transverse constant intervals (where the longitudinal interval and the transverse interval may be equal to or different from each other). As can be well understood from FIG. 11, ten specific patterns 22 belonging to the uppermost row, lowermost row, leftmost column, and rightmost column in the array of the specific patterns 22 are placed along the perimeter of the information recording area 23, while the remaining two specific patterns 22 are placed inside (around the center) away from the perimeter of the information recording area 23.

Like this, in the case where the specific patterns 22 are arranged inside away from the perimeter of the information recording area 23, when recorded digital information is read, the digital information can be read correctly even though the recording surface 20 has more or less distortions, as will be described later.

Figure 12:
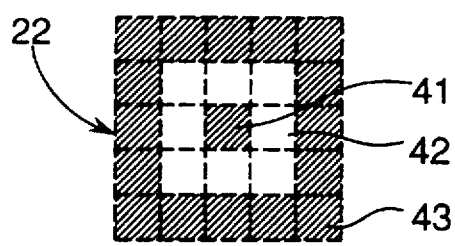
FIG. 12 is a view showing in detail the specific pattern.

As shown in FIG. 12, the specific pattern 22 in this case comprises a central portion 41 made up of one blackened cell a first loop portion 42 made up of eight whitened cells surrounding the central portion 41 in a loop, and a second loop portion 43 made up of sixteen blackened cells further surrounding the first loop portion 42 in a loop. As a whole, the specific pattern 22 forms a square block containing totally 25 cells of 5 rows×5 columns.

Figure 13:
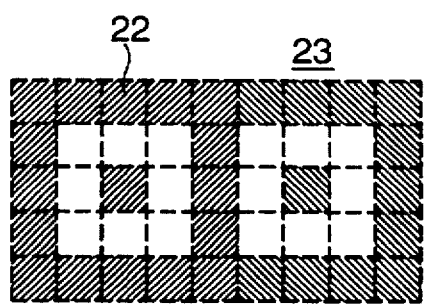
FIG. 13 is a view showing an example in which an identical pattern has appeared near the specific pattern in the information recording area.

This specific pattern 22 has such advantages as: (1) relatively easy to find even if arranged so as to be buried inside the information recording area 23; (2) the number of cells constituting the specific pattern 22 is as relatively small as 25; (3) even when an identical pattern appears near the specific pattern 22, it will appear only at relatively far positions (positions four cells shifted longitudinally or transversely) (see FIG. 13); (4) less affected by dirties or blurs because white and black cells are well balanced in arrangement; and (5) as the reading algorithm, easy to find by checking the features of the specific pattern 22 that the central portion (black) 41 forms a closed area surrounded by the first loop portion (white), and that the first loop portion (white) 42 also forms a closed area surrounded by the second loop portion (black) 43.

Figure 14:
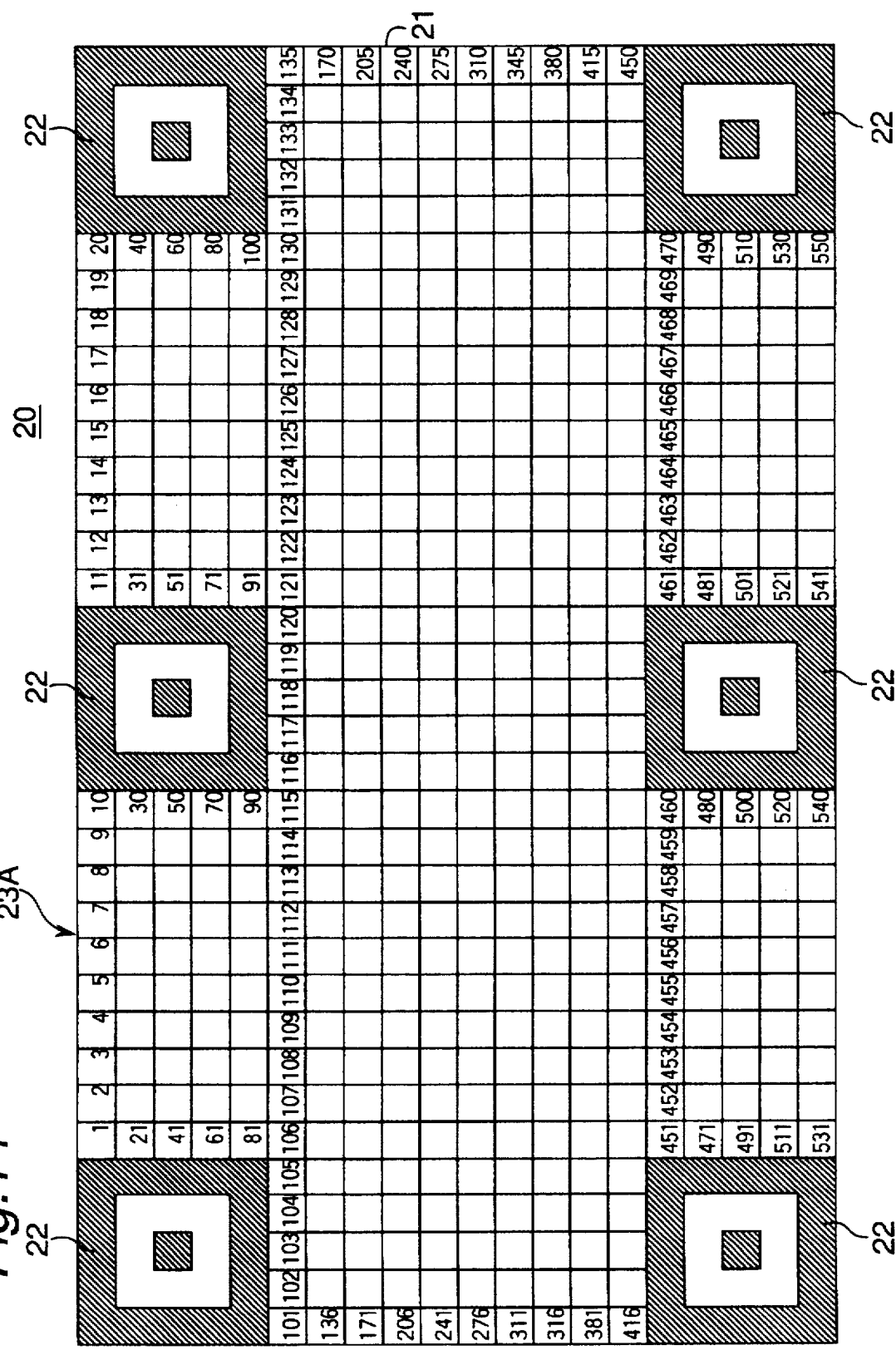
FIG. 14 is a view for explaining the way of mapping original recording-object information to the information recording area of FIG. 10.

The way of mapping recording-object information to the information recording area 23 provided with the specific patterns 22 is as shown in FIG. 14. FIG. 14 shows a portion 23A of transverse 35×longitudinal 20 cells corresponding to part of the information recording area 23 shown in FIG. 10. In this information recording area 23A, six (transverse 3×longitudinal 2) specific patterns 22 are placed every 15 transverse meshes and every 15 longitudinal meshes. Out of 700 cells of the information recording area 23A, 150 cells are used for the specific patterns 22, and the remaining 550 cells 21 are used to represent the original recording-object information. The cells 21 representing the original recording-object information are given addresses 1, 2, . . . , 550 (partly shown for simplicity). The addresses are numbered in such a manner that the first row is addressed 1 to 10, starting with the leftmost mesh of the first row adjacent to the upper left corner specific pattern 22, and increasing rightward of the cell, and further beyond the specific pattern 22 at the middle of the top row, similarly addressed 11 to 20. The second to fifth rows are addressed in the same manner, until the rightmost mesh of the fifth row adjacent to the specific pattern is addressed 100. The sixth to fifteenth rows are numbered so that the address increases one by one rightward from the leftmost cell of each row. The sixteenth to twentieth rows are numbered in the same manner as the first to fifth rows with the middle specific pattern 22 jumped over. In this way, when a specific pattern 22 is aced at the middle of a row, the addressing is done with the specific pattern 22 jumped over. The first bit information of the recording-object information corresponds to the cell of address 1, where if the value of the bit information is "1", the cell is blackened; if it is "0", the cell is whitened. From this on, recording-object information is recorded likewise, whereby the digital information of 550 bits can be mapped to 550 cells 21 of the information recording area 23A.

Figure 4:
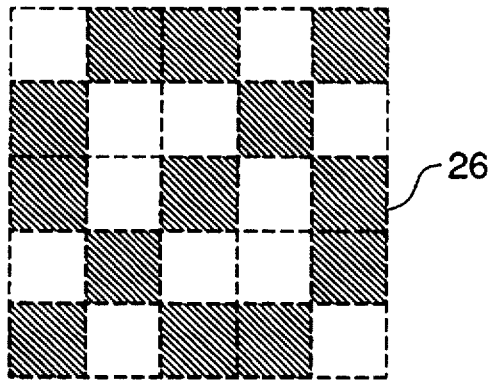
FIG. 4 is a view showing another example of the unitary pattern.
Figure 15:
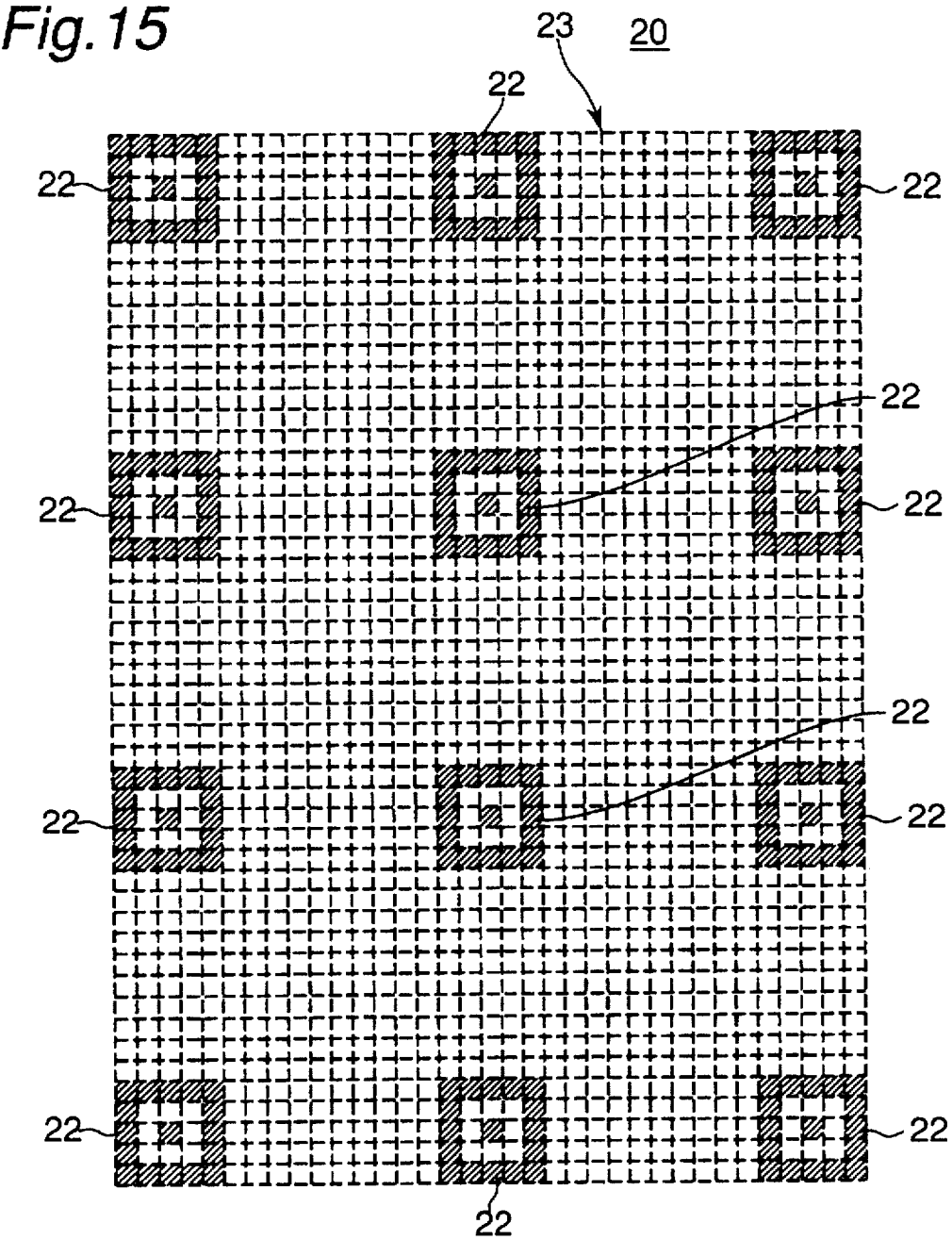
FIG. 15 is a view showing a primary pattern in which the specific patterns are arranged in the information recording area of FIG. 10 and the original recording-object information all corresponds to "0s"
Figure 16:
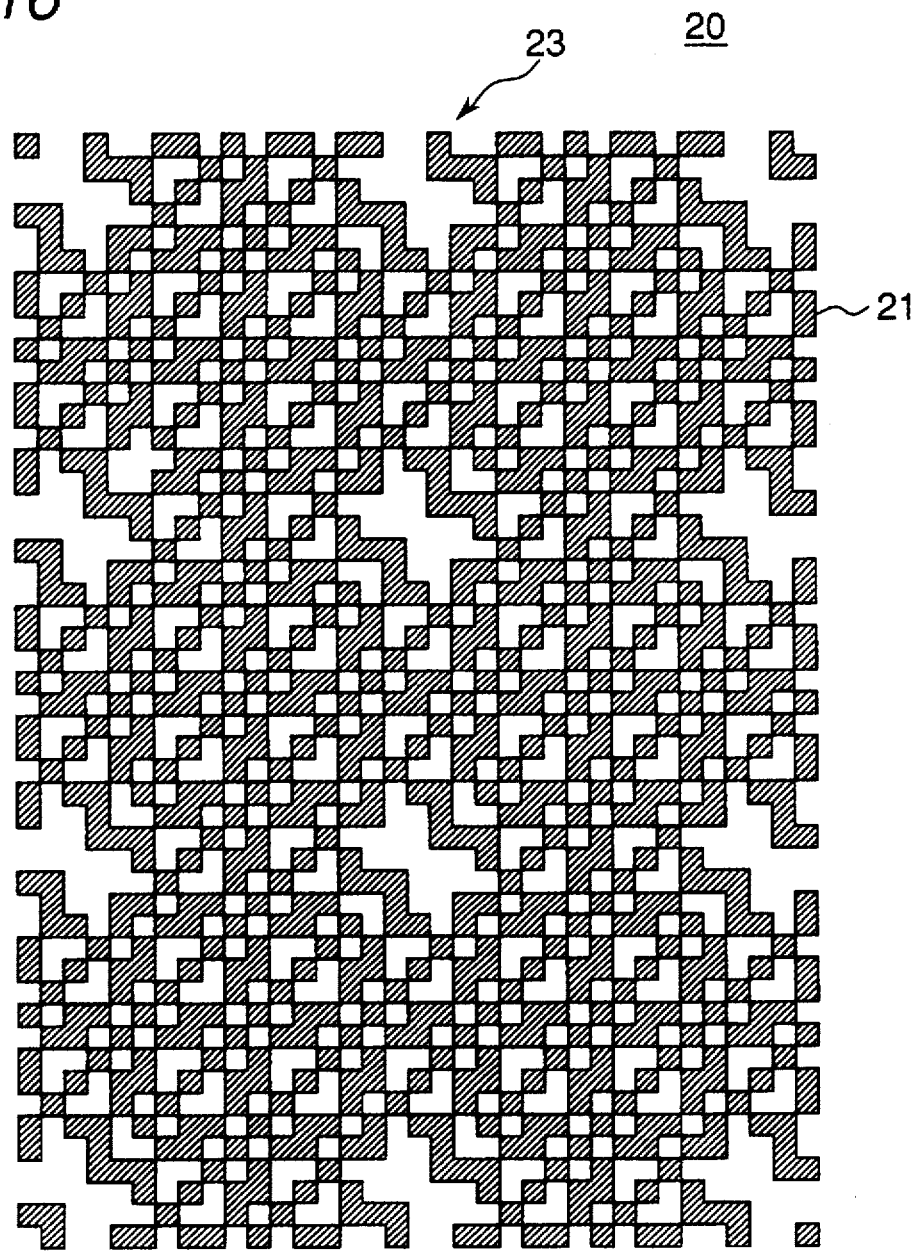
FIG. 16 is a view showing a secondary pattern obtained by modulating the entire primary pattern of FIG. 15 with the modulation pattern of FIG. 4.

Now, in the case where the specific patterns 22 are arranged in this way in a particular region within the information recording area 23, if the secondary pattern is created by modulating the entirety of the primary pattern, the specific patterns 22 would be deformed such that their function as control information might be lost. For example, FIG. 15 shows a primary pattern in which the specific patterns 22 are arranged in the information recording area 23 in the same way as in FIGS. 10 and 11, and in which the original recording-object information all corresponds to "0s" (whites). In this case, a square small block of longitudinal 5×transverse 5 cells equal to the shape of the specific pattern 22 is set. Also, a modulation pattern 26 as shown in FIG. 4 is selected. Then, portions of the primary pattern of FIG. 15 corresponding to the small blocks are extracted sequentially from left top corner to right top corner, then from left to right of the succeeding step, and so on. The extracted patterns are associated with the modulation pattern 26 in the units of meshes in one-to-one correspondence, and exclusive-ORs of values represented by corresponding cells are calculated, respectively. Then, patterns in the units of small blocks composed of marks representing the resulting values of exclusive-ORs are arrayed in order, whereby the secondary pattern is created. When this second pattern is expressed in the information recording area 23, the specific patterns 22 would be deformed as shown in FIG. 16 such that they would no longer serve their function as control information.

Figure 17:
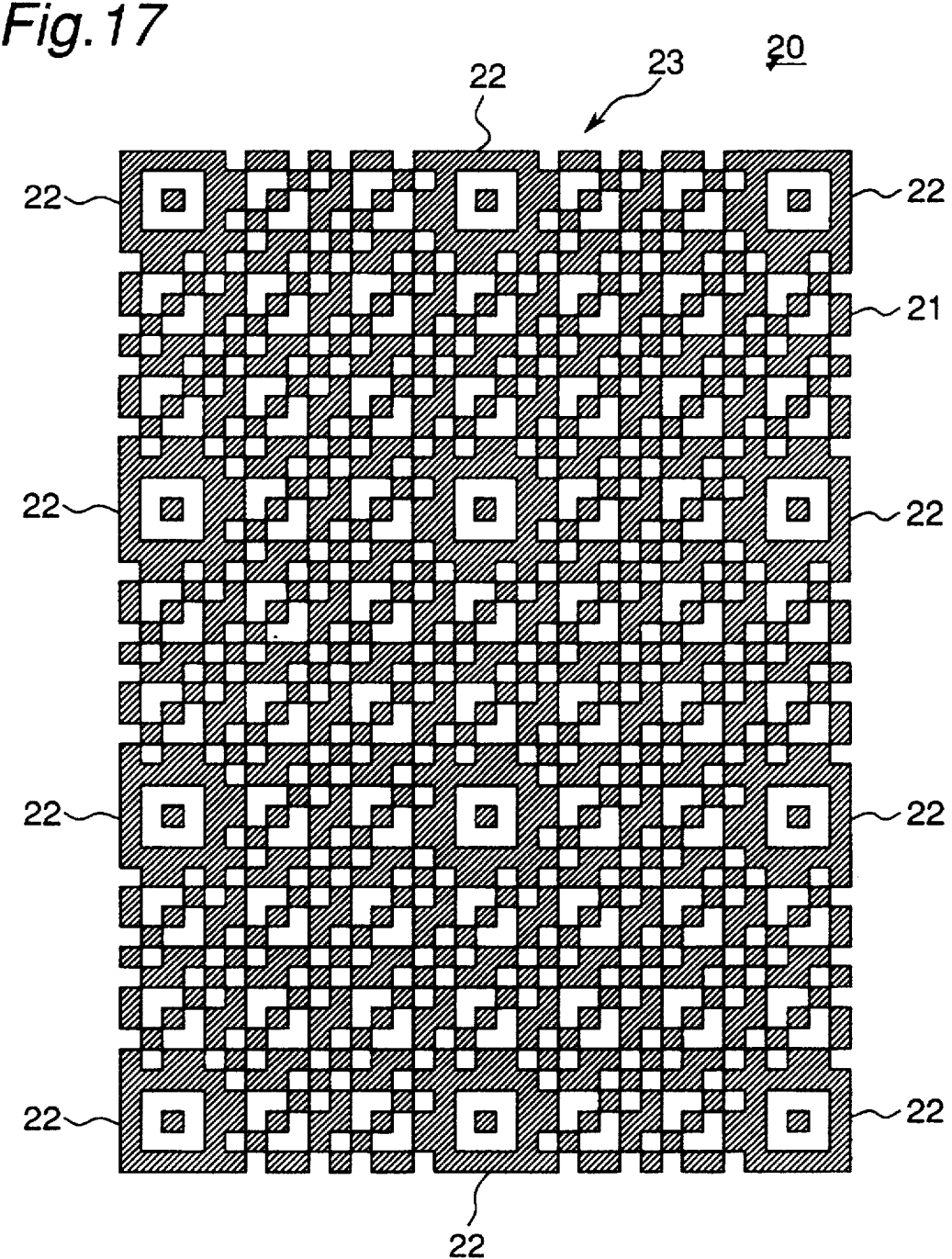
FIG. 17 is a view showing a secondary pattern obtained by modulating part of the primary pattern of FIG. 15 other than specific patterns, with the modulation pattern of FIG. 4.

Accordingly, when the small blocks of the specific patterns 22 are extracted out of the primary pattern, the small blocks of the specific patterns 22 are used, as they are, as part of the secondary pattern without exclusive-ORing them with the modulation pattern 26. With such measures, as shown in FIG. 17, the specific patterns 22 as control information can be left in the information recording area 23 while such a modulation that whites and blacks are dispersed is applied to the original recording-object information.

Digital recording information in the form that the specific patterns 22 are arranged within the information recording area 23 as in FIGS. 10 and 17 can be read in the following way.

First, positional information of the specific patterns 22 is obtained based on the arrangement information that the specific patterns 22 are arranged into a lattice shape.

Figure 18:
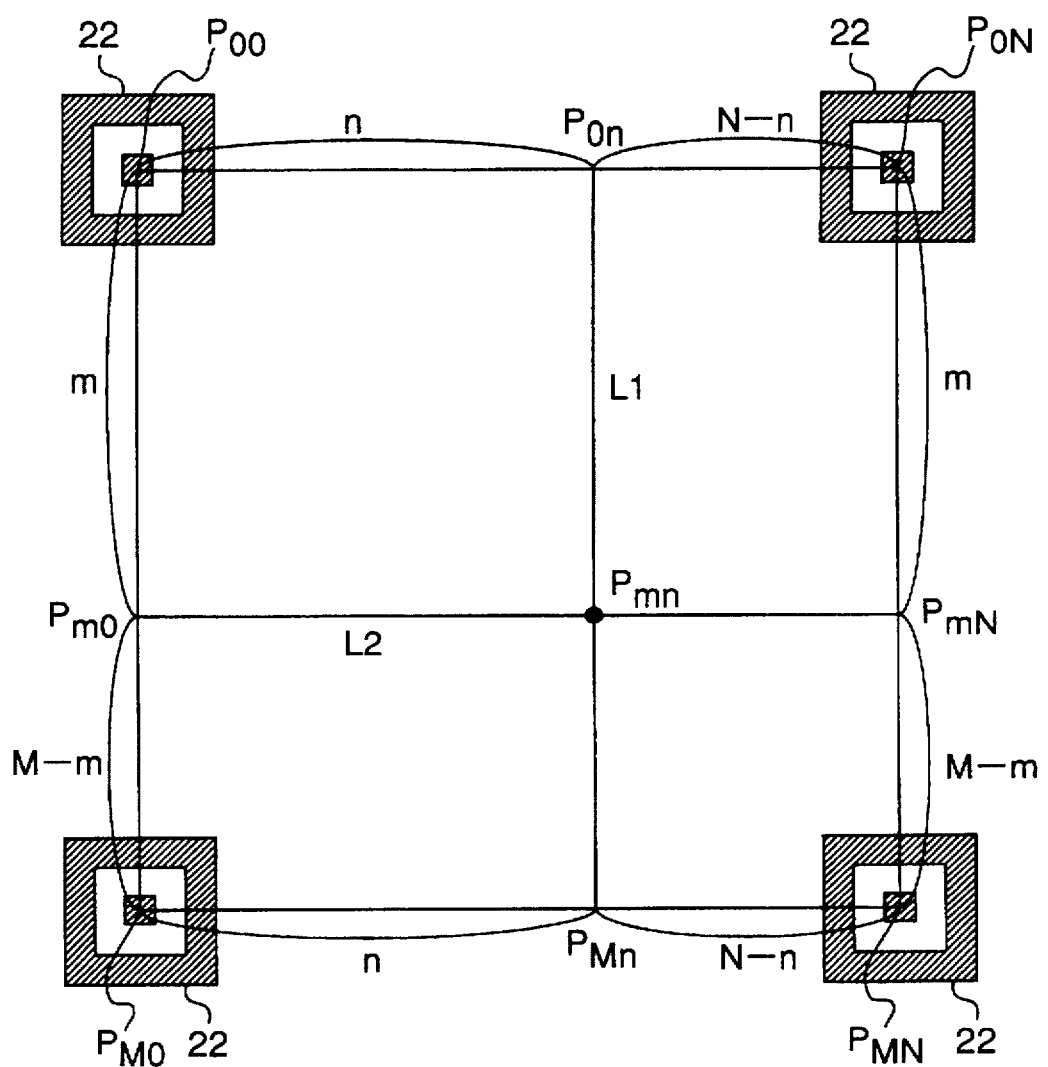
FIG. 18 is a view for explaining the way of reading the values of cells of a region surrounded by four specific patterns in the information recording area of FIG. 10.

Next, the values of cells 21 representing the original recording-object information are obtained in the way as shown in FIG. 18.

FIG. 18 schematically illustrates a region containing four adjacent specific patterns 22 (a region containing cells of M rows by N columns) out of the information recording area 23. Even if an irregular distortion has occurred over the whole recording surface 20, the distortion occurring to such a small region surrounded by four adjacent specific patterns can be approximated to an almost proportional distortion.

Referring to FIG. 18, assume that the position of the top leftmost (row O, column O) specific pattern 22 is $P_{OO}$, the position of the top rightmost (row O, column N) specific pattern 22 is $P_{ON}$, the position of the bottom leftmost (row M, column O) specific pattern 22 is $P_{MO}$, the position of the bottom rightmost (row M, column N) is $P_{MN}$, and that the position of the cell of the mth row and the nth column (where m, n are arbitrary integers) in the region surrounded by these four specific patterns 22 is $P_{mn}$.

If the point that internally divides the line segment connecting $P_{OO}$ and $P_{ON}$ at a ratio of n:(N-n) is $P_{On}$, the point that internally divides the line segment connecting $P_{MO}$ and $P_{MN}$ at a ratio of n:(N-n) is $P_{Mn}$, the point that internally divides the line segment connecting $P_{OO}$ and $P_{MO}$ at a ratio of m:(M-m) is $P_{mO}$, and the point that internally divides the line segment connecting $P_{ON}$ and $P_{MN}$ at a ratio of m:(M-m) is $P_{mN}$, then the position of the mesh $P_{mn}$ to be determined can be expressed as the intersecting point between a line L1 connecting $P_{On}$ and $P_{Mn}$ and another line L2 connecting $P_{mO}$ and $P_{mN}$. The intersecting point $P_{mn}$ of the lines L1 and L2 is expressed also as a point that internally divides the line L1 at a ratio of m:(M-m) or a point that internally divides the line L2 at a ratio of n:(N-n). By using the positions $P_{OO}$, $P_{ON}$, $P_{MO}$, $P_{MN}$ of the four specific patterns 22, the position $P_{mn}$ of a cell within the region surrounded by these four specific patterns 22 can be expressed as:

$$P_{mn} = \frac{(M-m)(N-n)P_{OO} + (M-m)n \cdot P_{ON} + m(N-n)P_{MO} + m \cdot n \cdot P_{MN}}{M \cdot N} \quad (1)$$

In this way, by determining the position $P_{mn}$ of each, cell and by looking into the value of the position $P_{mn}$, the values of the individual cells can be known.

(Fourth Embodiment)

Next, an example of the digital information decoding method, where which modulation pattern has been selected in the recording stage is known, is explained.

First, a secondary pattern expressed in the information recording area 23 of FIG. 5 is decoded. Assume that this secondary pattern is known to have been obtained by modulating the primary pattern of FIG. 22 with the modulation pattern 24 of FIG. 2.

For decoding the secondary pattern of FIG. 5, a pattern identical to the modulation pattern 24 of FIG. 2 is adopted as a demodulation pattern (denoted by the same numeral 24 for simplicity). Then, the secondary pattern is extracted in the units of small blocks T as shown in FIG. 1 sequentially from left top corner to right top corner, then from left to right of the succeeding step, and so on. The extracted patterns are associated with the demodulation pattern 24 in one-to-one correspondence, and exclusive-ORs of values represented by corresponding cells are calculated, respectively. The patterns in the units of small blocks composed of marks representing the resulting values of exclusive-ORs are arrayed sequentially from left top corner to right top corner, then from left to right of the succeeding step, and so on. As a result, the primary pattern shown in FIG. 22 can be obtained as the original pattern.

Likewise, the secondary pattern expressed in the information recording area 23 in FIG. 9 is decoded. Assume that this secondary pattern is known to have been obtained by modulating the primary pattern of FIG. 22 with a first modulation pattern of "black/white/black/white/white/black/white/black" representing "10100101" and a second modulation pattern of "white/black/white/black/black/white/black/white" representing "101011010".

For decoding the secondary pattern of FIG. 9, first and second demodulation patterns identical to the first and second modulation patterns are adopted. Then, the secondary pattern is extracted in the units of small blocks (not shown) composed of eight cells linearly adjoining one another in one row, sequentially from left top corner to right top corner, then from left to right of the succeeding step, and so on. For odd rows, the extracted patterns are associated with the first demodulation pattern in one-to-one correspondence. For even rows, on the other hand, the extracted patterns are associated with the second demodulation pattern in one-to-one correspondence. Thus, exclusive-ORs of values represented by corresponding cells are calculated, respectively. Then, the patterns in the units of small blocks composed of marks representing the resulting values of exclusive-ORs are arrayed sequentially from left top corner to right top corner, from left to right of the succeeding step, and so on. As a result, the primary pattern shown in FIG. 22 can be obtained as the original pattern.

(Fifth Embodiment)

Next, an example of the digital information decoding method, where which modulation pattern has been selected in the recording stage is unknown, is explained.

In such a case, a conceivable method may be such that all the types of demodulation corresponding to the possible modulation patterns that might have been selected in the recording stage are performed and one matching to a predetermined form, out of the obtained information, is adopted.

The predetermined form in this case may be the one so called header information. In a simple example, a constant of, for example, "01011100" is added to the head of the original recording-object information in the recording stage, and information is recorded by using identical modulation patterns over the entire information recording area.

Figure 21:
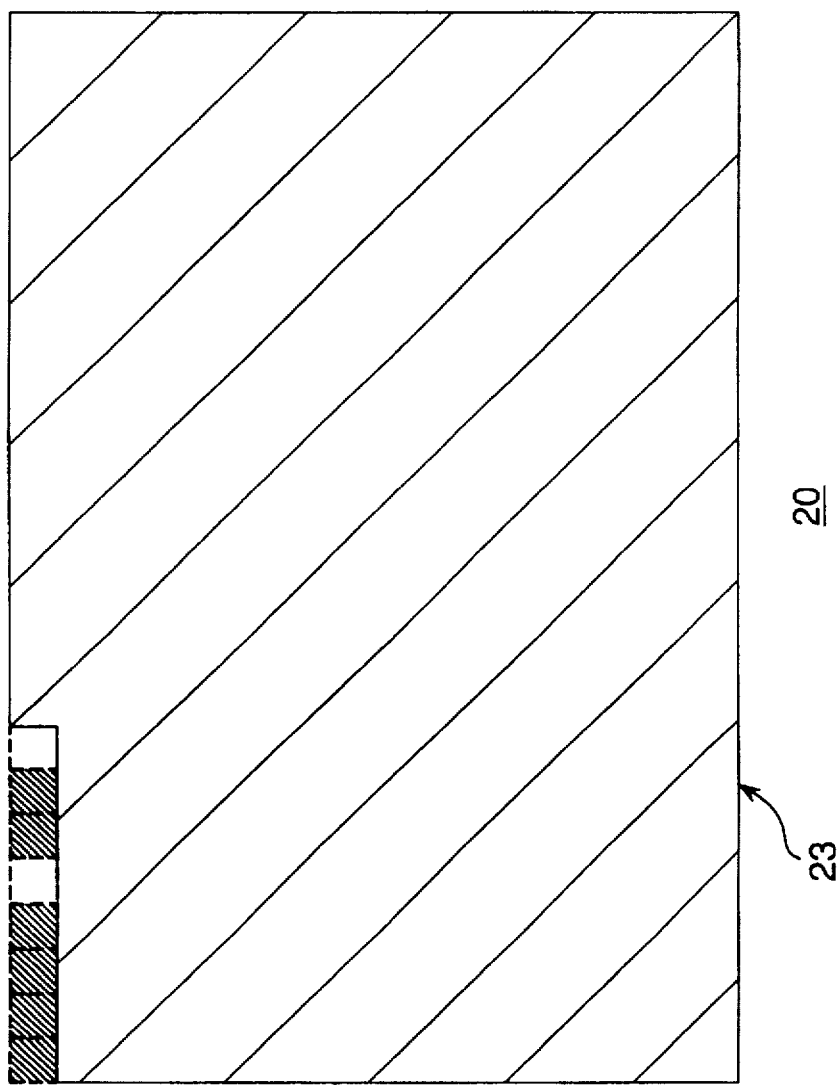
FIG. 21 is a view showing an example of the secondary pattern to which a digital information decoding method of an embodiment is to be applied.

For example, a secondary pattern expressed in the information recording area 23 of FIG. 21 (where only the left top corner portion is shown) is decoded. Demodulation patterns corresponding to all the possible modulation patterns that might have been selected in the recording stage are prepared.

Figure 20:
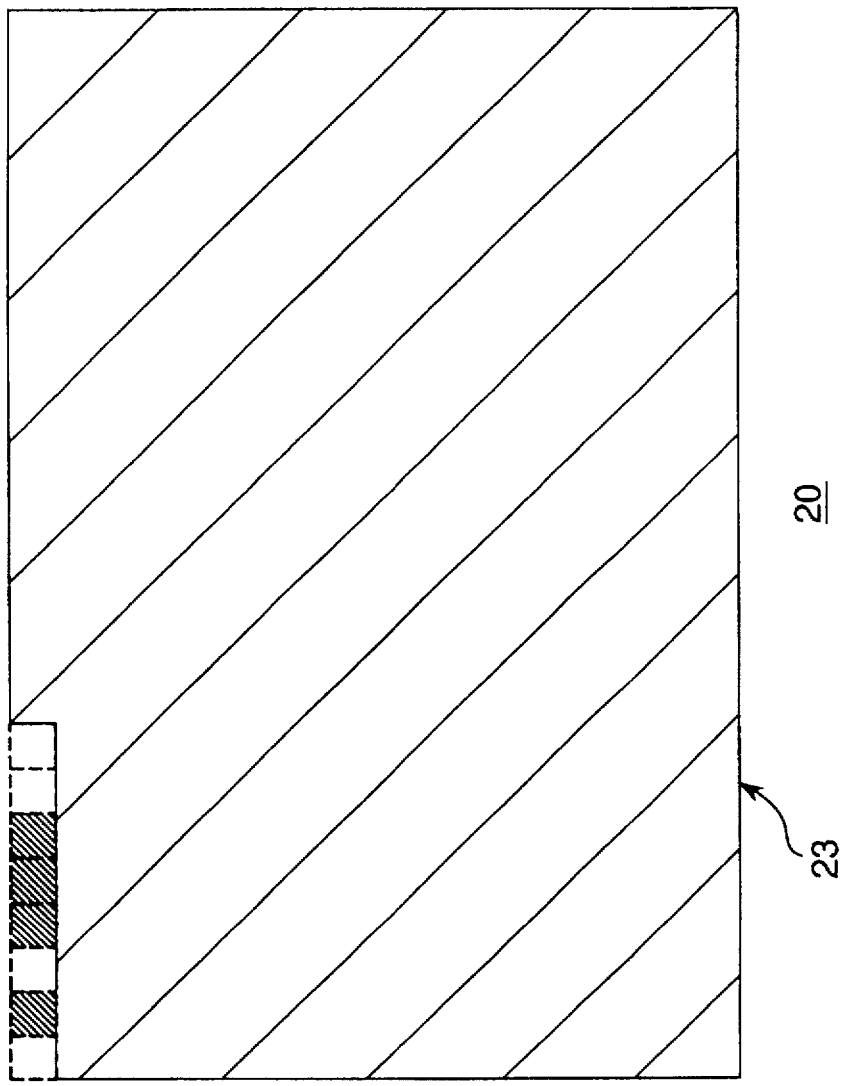
FIG. 20 is a view showing a pattern in which the values of the top eight cells in the information recording area correspond to header information.

The secondary pattern of FIG. 21 is extracted in the units of, for example, small blocks T of FIG. 1. In this case, a pattern of the left top corner small block and another pattern of its right adjacent small block are extracted. For the extracted patterns in the units of small blocks, values of the exclusive-ORs with the demodulation patterns are calculated. In this example, when demodulation is performed by using the modulation pattern 24, the pattern "white/black/white/black/black/black/white/white" representing "101011100" will appear at the left top corner of the information recording area 23 as shown in FIG. 20. Accordingly, it can be decided that the modulation pattern 24 of FIG. 2 has been selected in the recording stage. Thereafter, the remaining portion of the secondary pattern is extracted sequentially in the units of small blocks T. Then, the extracted patterns are associated with the demodulation pattern 24 in the units of meshes in one-to-one correspondence, exclusive-ORs of values represented by corresponding cells are calculated respectively, and patterns in the units of small blocks T composed of marks representing the resulting values of 44 exclusive-ORs are arrayed in order. As a result, the original pattern (primary pattern) can be obtained.

In addition, if a pattern representing "01011100" has appeared at the head of the information recording area 23 initially in the decoding process, as shown in FIG. 20, then the demodulation with exclusive-ORs is not performed but a given two-dimensional pattern is outputted, as it is, as the primary pattern.

Also, if information has been recorded in the information recording area 23 by using a plurality of types of modulation patterns or without modulation, then a decision on the modulation patterns is made in the decoding stage sequentially in the units of one small block or several small blocks. Then, by arraying demodulated patterns in the units of small blocks sequentially from left top corner to right top corner, from left to right of the succeeding step, and so on, the original pattern (primary pattern) is obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of recording digital information, comprising the steps of:

defining a matrix of cells corresponding to bits in an information recording area provided within a flat recording surface, providing the cells with optically recognizable marks, each corresponding to a value of "0" or "1" to thereby record recording-object digital information as a two-dimensional pattern composed of the marks, setting a small block composed of three or more adjoining cells to each of which the mark corresponding to a value "0" or the mark corresponding to a value of "1" is to be given, such that the small block has a pattern of the marks, said small block being configured such that when a plurality of said small blocks are arrayed together, the plurality of small blocks fill the information recording area without gaps therebetween;

selecting as a modulation pattern, from among a plurality of the patterns assumed by the small block, a pattern in which the marks in at least one column include one or more marks corresponding to a value of "0" and one or more marks corresponding to a value of "1", and in which the marks in at least one row include one or more marks corresponding to a value of "0" and one or more marks corresponding to a value of "1";

extracting the marks given to the cells of the information recording area as a primary pattern;

calculating exclusive-ORs of values of the extracted marks, in units of the small blocks, of the primary pattern and values of the marks of the modulation pattern, respectively; and arraying the calculated exclusive-ORs in the information recording area as a secondary pattern.

2. A method of recording digital information, comprising steps of:

defining a matrix of cells corresponding to bits in an information recording area provided within a flat recording surface, providing the cells with optically recognizable marks each corresponding to a value of "0" and "1", and recording recording-object digital information as a two-dimensional pattern composed of the marks, setting a small block composed of two or more cells adjoining one another within one row or one column;

selecting, as a first modulation pattern, a pattern made up by giving marks of different values to cells adjoining one another in a direction in which the small block extends, among a group of patterns that the small block can assume, and selecting a second modulation pattern obtained by inverting binary values of the marks of the first modulation pattern;

extracting, in units of small blocks, a primary pattern made up by giving marks to the cells of the information recording area in correspondence to the recording-object information; and expressing a secondary pattern which is formed through steps of associating the extracted patterns with the first modulation pattern in one-to-one correspondence for odd rows or columns while associating the extracted patterns with the second modulation pattern in one-to-one correspondence for even rows or columns, calculating exclusive-ORs of values represented by corresponding cells, respectively, and arraying patterns in the units of small blocks composed of marks representing the values of the exclusive-ORs in order.

3. The method of recording digital information according to claim 1, further comprising steps of:

selecting a plurality of types of modulation patterns or first and second modulation patterns; and using the plurality of types of modulation patterns or first and second modulation patterns depending on a pattern configuration of said extracted primary pattern.

4. The method of recording information according to claim 1, further comprising a step of:

using a pattern of a portion of the primary pattern corresponding to a particular region of the information recording area, as it is, as a pattern for a portion of the second pattern corresponding to the particular region.

5. A digital information decoding method for decoding recorded information recorded according to claim 1, comprising the steps of:

adopting, as a demodulation pattern, a pattern identical to the modulation pattern;

obtaining the primary pattern through steps of extracting, in the units of small blocks, the secondary pattern expressed in the information recording area, associating the extracted patterns with the demodulation pattern in units of cells in one-to-one correspondence, calculating exclusive-ORs of values represented by corresponding cells, and arraying patterns in the units of small blocks composed of marks representing values of the exclusive-ORs in order.

6. The digital information decoding method according to claim 5, further comprising steps of:

preparing demodulation patterns corresponding to all possible types of modulation patterns that might have been selected in a stage at which the secondary pattern is recorded in the information recording area; and calculating the exclusive-ORs by using the demodulation patterns, for the patterns extracted in the units of small blocks, deciding whether or not values of the exclusive-ORs are information having a predetermined form, and, if the values of the exclusive-ORs are information having a predetermined form, then adopting the information as information corresponding to the small blocks of the information recording area.

7. The method of recording digital information according to claim 2, further comprising steps of:

selecting a plurality of types of modulation patterns or first and second modulation patterns; and using the plurality of types of modulation patterns or first and second modulation patterns depending on a pattern configuration of said extracted primary pattern.

8. The method of recording information according to claim 2, further comprising a step of:

using a pattern of a portion of the primary pattern corresponding to a particular region of the information recording area, as it is, as a pattern for a portion of the second pattern corresponding to the particular region.

9. The method of recording information according to claim 3, further comprising a step of:

using a pattern of a portion of the primary pattern corresponding to a particular region of the information recording area, as it is, as a pattern for a portion of the second pattern corresponding to the particular region.

10. A digital information decoding method for decoding recorded information recorded according to claim 2, comprising the steps of:

adopting, as a demodulation pattern, a pattern identical to the modulation pattern;

obtaining the primary pattern through steps of extracting, in the units of small blocks, the secondary pattern expressed in the information recording area, associating the extracted patterns with the demodulation pattern in units of cells in one-to-one correspondence, calculating exclusive-ORs of values represented by corresponding cells, and arraying patterns in the units of small blocks composed of marks representing values of the exclusive-ORs in order.

11. A digital information decoding method for decoding recorded information recorded according to claim 3, comprising the steps of:

adopting, as a demodulation pattern, a pattern identical to the modulation pattern;

obtaining the primary pattern through steps of extracting, in the units of small blocks, the secondary pattern expressed in the information recording area, associating the extracted patterns with the demodulation pattern in units of cells in one-to-one correspondence, calculating exclusive-ORs of values represented by corresponding cells, and arraying patterns in the units of small blocks composed of marks representing values of the exclusive-ORs in order.

12. A digital information decoding method for decoding recorded information recorded according to claim 4, comprising the steps of:
- adopting, as a demodulation pattern, a pattern identical to the modulation pattern;
- obtaining the primary pattern through steps of extracting, in the units of small blocks, the secondary pattern expressed in the information recording area,
- associating the extracted patterns with the demodulation pattern in units of cells in one-to-one correspondence,
- calculating exclusive-ORs of values represented by corresponding cells, and
- arraying patterns in the units of small blocks composed of marks representing values of the exclusive-ORs in order.

* * * * *